US012730625B2

(12) United States Patent
Sahar et al.

(10) Patent No.: US 12,730,625 B2
(45) Date of Patent: Sep. 8, 2026

(54) TECHNIQUES FOR UPDATING CONTENT FOR SOFTWARE APPLICATIONS USING VECTOR TAGGING

(71) Applicant: Guidde Incorporated, Belmont, CA (US)

(72) Inventors: Dan Sahar, Belmont, CA (US); Yoav Einav, Ramat Hasharon (IL); Asaf David, Hod Hasharon (IL)

(73) Assignee: Guidde Incorporated, Belmont, CA (US)

( * ) Notice: Subject to any disclaimer, the term of this patent is extended or adjusted under 35 U.S.C. 154(b) by 330 days.

(21) Appl. No.: 18/600,351

(22) Filed: Mar. 8, 2024

(65) Prior Publication Data

US 2025/0284480 A1 Sep. 11, 2025

(51) Int. Cl.
*G06F 8/65* (2018.01)

(52) U.S. Cl.
CPC .................................... *G06F 8/65* (2013.01)

(58) Field of Classification Search
CPC ........................................................ G06F 8/65
See application file for complete search history.

(56) References Cited

U.S. PATENT DOCUMENTS 8,914,840 B2 12/2014 Reisman
9,411,889 B2 8/2016 Zhu et al.
10,262,342 B2 4/2019 Nath et al.
10,469,980 B2 11/2019 Jakobson et al.
11,086,910 B2 8/2021 Kreft
11,113,333 B2 9/2021 Maharajh et al.
11,178,522 B2 11/2021 Kim et al.
11,307,969 B2 4/2022 Scoda
11,411,992 B2 8/2022 N
11,689,927 B2 6/2023 Smith et al.
2008/0143895 A1* 6/2008 Peterka .................. G02B 30/31 348/E13.043
2008/0318672 A1* 12/2008 Ramaswamy ........ A63F 13/235 463/29
2017/0206211 A1 7/2017 Kreitler et al.
2017/0257609 A1* 9/2017 Chu ..................... H04N 9/3179
2019/0158609 A1 5/2019 Higgins et al.
2023/0139626 A1* 5/2023 Berliner ................ G06F 3/1423 345/156
2023/0298281 A1* 9/2023 Pease ...................... G06F 3/012 345/633
2024/0331716 A1* 10/2024 Bean ....................... G06F 1/163

* cited by examiner

*Primary Examiner* — Seth A Silverman
(74) *Attorney, Agent, or Firm* — M&B IP Analysts, LLC

(57) ABSTRACT

A system and method for detecting content updates. A method includes creating a plurality of embeddings based on a first set of content demonstrating a workflow for using a software application, wherein each of the plurality of embeddings corresponds to a respective content stage of a plurality of content stages of the first set of content, wherein each content stage is a portion of the first set of content representing a respective part of the workflow for using the software application; and detecting a content update trigger based on the plurality of embeddings, wherein detecting the content update trigger further comprises comparing the first set of content to a second set of content with respect to the plurality of embeddings.

17 Claims, 10 Drawing Sheets

Conversion 310

Capture content 311

Break into stages 312

Tagging 320

Apply vector tagging 321

Classify stages 322

Replay setup 330

Configure agent 331

Replay 340

Perform workflow 341

Capture new content 342

Triggering 350

Identify differences 351

Alert on changes 352

TECHNIQUES FOR UPDATING CONTENT FOR SOFTWARE APPLICATIONS USING VECTOR TAGGING

TECHNICAL FIELD

The present disclosure relates generally to automatically updating documentation content related to software applications, and more specifically to updating content using vector tagging.

BACKGROUND

As companies increasingly turn to software to assist employees in completing tasks, training employees to use software has become essential to modern business. When employees are properly trained to use different software applications licensed by a company, those employees tend to be more efficient, productive, and collaborative. This can result in significant savings for the business, thereby increasing profitability and the ability to complete deliverables on time.

Many organizations face significant challenges in onboarding and training new employees, particularly when it comes to software. This can be a major pain point for these organizations, especially if turnover is high and employees need to be trained repeatedly in short periods of time. The lifeblood of many modern organizations is the common knowledge used by employees, and sharing this knowledge presents many logistical challenges.

Likewise, providers of software services (e.g., in the form of software applications) face challenges in educating the members of the public who use the service or other external stakeholders on how to use their services. Successfully educating stakeholders on how to use a software application can be very beneficial for customer acquisition and retention, or otherwise with securing buy in from stakeholders for the organization's activities.

To address these challenges, some organizations create knowledge bases and share content created by employees internally or with external stakeholders such as customers. Although this may help a bit when initially training new employees or educating stakeholders on how to use software applications, many questions related to software come up during actual work instead of during training. Employees or stakeholders may be able to reference the knowledge base, but particularly for video content or other content that is not easy to search through, referencing content from the knowledge base may result in much wasted time looking for the answer to any given question.

A challenge for organizations seeking to use content as part of a knowledge base, and particularly when using video content which demonstrates how to use a particular software application or feature of a software application, is maintaining up-to-date content over time. More specifically, as applications undergo software updates or other changes, previously recorded content may cease to show the same actions as would be required to navigate the updated application. Manually identifying software application changes and manually updating content are cumbersome, time-consuming, and rely on subjective judgments which are prone to human error.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting content updates. The method comprises: creating a plurality of embeddings based on a first set of content demonstrating a workflow for using a software application, wherein each of the plurality of embeddings corresponds to a respective content stage of a plurality of content stages of the first set of content, wherein each content stage is a portion of the first set of content representing a respective part of the workflow for using the software application; and detecting a content update trigger based on the plurality of embeddings, wherein detecting the content update trigger further comprises comparing the first set of content to a second set of content with respect to the plurality of embeddings.

Certain embodiments disclosed herein also include a non-transitory computer readable medium having stored thereon causing a processing circuitry to execute a process, the process comprising: creating a plurality of embeddings based on a first set of content demonstrating a workflow for using a software application, wherein each of the plurality of embeddings corresponds to a respective content stage of a plurality of content stages of the first set of content, wherein each content stage is a portion of the first set of content representing a respective part of the workflow for using the software application; and detecting a content update trigger based on the plurality of embeddings, wherein detecting the content update trigger further comprises comparing the first set of content to a second set of content with respect to the plurality of embeddings.

Certain embodiments disclosed herein also include a system for detecting content updates. The system comprises: a processing circuitry; and a memory, the memory containing instructions that, when executed by the processing circuitry, configure the system to: create a plurality of embeddings based on a first set of content demonstrating a workflow for using a software application, wherein each of the plurality of embeddings corresponds to a respective content stage of a plurality of content stages of the first set of content, wherein each content stage is a portion of the first set of content representing a respective part of the workflow for using the software application; and detect a content update trigger based on the plurality of embeddings, wherein detecting the content update trigger further comprises comparing the first set of content to a second set of content with respect to the plurality of embeddings.

Certain embodiments disclosed herein include the method, non-transitory computer readable medium, or system noted above or below, further including or being configured to perform the following step or steps: identifying coordinates of a plurality of content elements among the first set of content; and creating the plurality of embeddings based on the identified coordinates.

Certain embodiments disclosed herein include the method, non-transitory computer readable medium, or system noted above or below, further including or being configured to perform the following step or steps: identifying the plurality of content stages based on the plurality of content elements among the first set of content; and classifying the content stages based on at least one interaction with the plurality of content elements among the first set of content.

Certain embodiments disclosed herein include the method, non-transitory computer readable medium, or system noted above or below, further including or being configured to perform the following step or steps: tagging each of the plurality of content stages with the corresponding embedding.

Certain embodiments disclosed herein include the method, non-transitory computer readable medium, or system noted above or below, further including or being configured to perform the following step or steps: simulating at least one content stage of the plurality of content stages; and capturing the second set of content based on the simulation.

Certain embodiments disclosed herein include the method, non-transitory computer readable medium, or system noted above or below, wherein the plurality of embeddings is a plurality of first embeddings, further including or being configured to perform the following step or steps: creating a plurality of second embeddings based on the captured set of second content, wherein detecting the content update trigger further comprises comparing the plurality of first embeddings to the plurality of second embeddings.

Certain embodiments disclosed herein include the method, non-transitory computer readable medium, or system noted above or below, wherein the simulated at least one content stage demonstrates at least one interaction event.

Certain embodiments disclosed herein include the method, non-transitory computer readable medium, or system noted above or below, further including or being configured to perform the following step or steps: replaying at least one action demonstrated in the first set of content.

Certain embodiments disclosed herein include the method, non-transitory computer readable medium, or system noted above or below, further including or being configured to perform the following step or steps: determining at least one aspect of a first environment in which the at least one first set of content was captured; and simulating at least a portion of the workflow for using the software application using a second environment having the determined at least one aspect.

Certain embodiments disclosed herein include the method, non-transitory computer readable medium, or system noted above or below, further including or being configured to perform the following step or steps: submitting a plurality of commands based on the at least one content stage, wherein the plurality of commands is executed with respect to the software application via a command-line interface.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
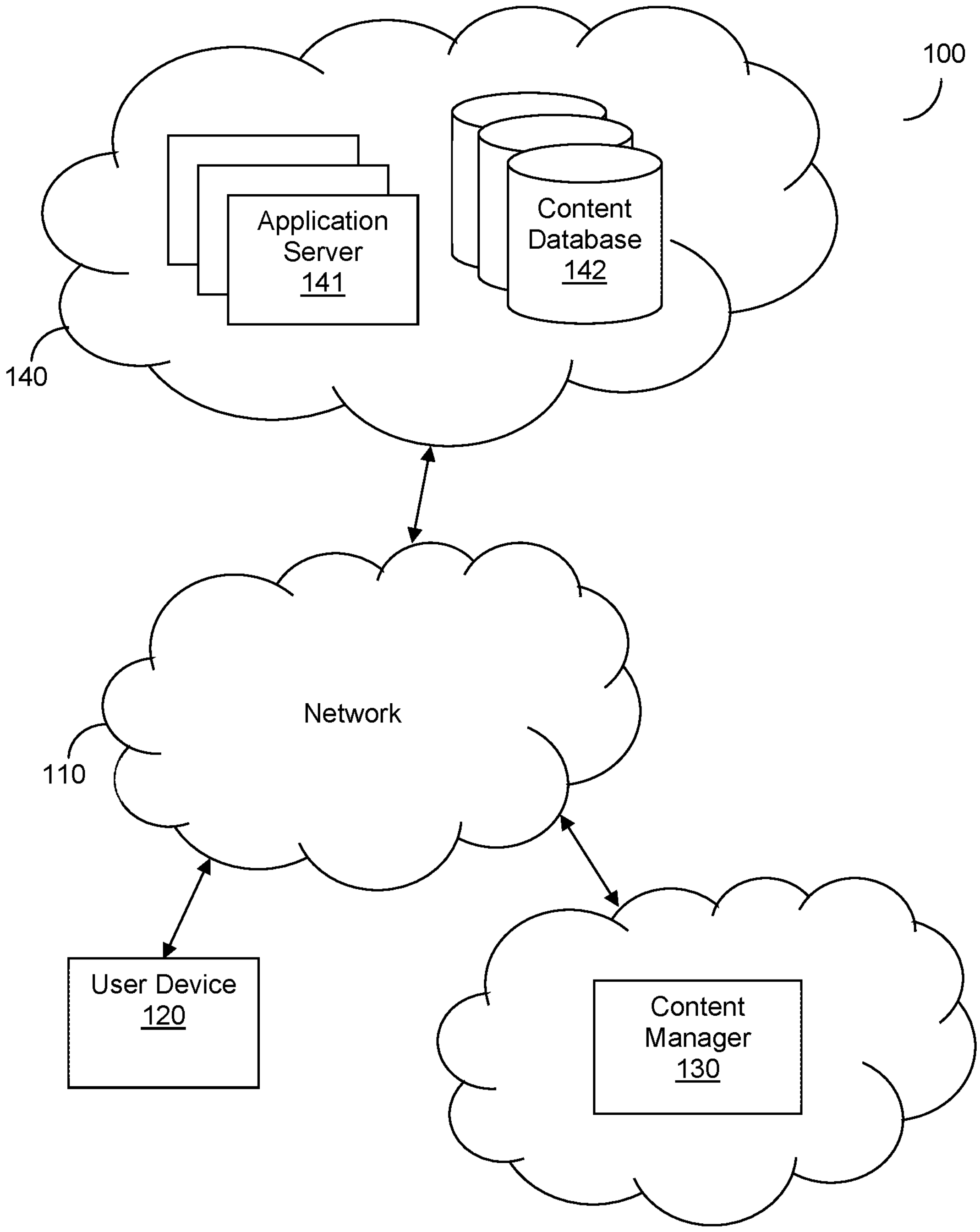
FIG. 1 is a network diagram utilized to describe various disclosed embodiments.

The various disclosed embodiments include a method and system for updating content using vector tagging. In particular, the disclosed embodiments include techniques for creating vectors with respect to user interface elements or other components of software applications in order to tag portions of content showing use of software applications (which may also be referred to herein as simply "applications"). The vectors embed information indicating aspects of the software application as demonstrated in the content such as, for example, location and function of visual icons or other interactive elements which the content demonstrates interacting with. Accordingly, the vectors provide a measurable representation of different stages of content (i.e., portions of content representing respective actions or groups of activities while using the software application) which may be compared via differential functions and utilized to objectively detect changes in the application which may prompt content updates.

In this regard, it is noted that existing solutions for updating content showing use of software applications rely on humans to manually identify when a software application has changed, decide when to record new content, and update the content by either replacing or editing the existing content for the software application. These manual steps each require making subjective judgments about whether the content "seem" to be different and in which ways the content differs, as well as determining whether differences in content reflect changes in the underlying software application whose usage is demonstrated by the content.

As a result, this process is subject to human error and can arrive at different results depending on the person who is making update decisions. The disclosed embodiments, which translate elements illustrated or otherwise demonstrated in content into measurable values which collectively represent a state of an application as depicted in a given portion of content, allow for objectively determining differences between content and identifying portions of content to be updated.

Additionally, as compared to hypothetical alternative automated processes, the disclosed embodiments allow for reducing computing resource consumption related to detecting changes and identifying portions of content to update. In particular, as compared to identifying differences by comparing content directly, the disclosed embodiments utilize vectors tagged to respective portions of content in order to compare only certain aspects of the content rather than the entirety of the content. Particularly for video content, comparing an entire piece of content directly to another entire piece of content requires a greater amount of computing resources and is slower than a basic vector comparison.

Accordingly, leveraging vectors as described herein allows for automatically triggering content updates as well as identifying portions of content to be updated while reducing consumption of processing and increasing processing speed. When content updates are checked frequently (for example, multiple times within a given day or week) across many different applications, the cumulative savings in computing resources and faster processing may be significant.

The disclosed embodiments also include techniques for replaying actions or other activities demonstrated in content with respect to a given software application in order to enable detection of changes which trigger content updates and to capture new content to be used for updating the existing content. Specifically, an agent or other program may be utilized to control a virtual browser or otherwise simulate a client for the software application in order to interact with the software application, thereby replaying a workflow of the original content to be updated. New content or portions of content may be captured while replaying the workflow, and that new content or portions of content may be analyzed in order to break the new content down into content stages and create new vectors for the content stages. The new vectors may be compared to the vectors for the original content (i.e., the existing content in a most recent state prior to the current replay) in order to detect changes and, in particular, detect changes with respect to one or more portions of the content.

To this end, various disclosed embodiments further include various techniques for manipulating web content which may be utilized to enable detecting changes and capturing new content. To further support and improve efficiency of such manipulation, some disclosed embodiments also include techniques for connecting to target applications via webhooks in order to detect new versions of the target application. Such detection of new versions of a target application may be utilized to trigger vector tagging and checking for changes in order to reduce the amount of vector comparisons needing to be performed, thereby further conserving computing resources.

FIG. 1 shows an example network diagram 100 utilized to describe the various disclosed embodiments. In the example network diagram 100, a user device 120, a content manager 130, and systems of a computing environment 140 communicate via a network 110.

The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device capable of receiving and displaying notifications. The user device 120 may be a user device operated by a user who creates content, who wishes to view content, or both.

For example, the user device 120 may be utilized to record or otherwise store content to be uploaded to the content databases 142. Such content uploaded via the user device 120 may be a first set of original content created by the user of the user device 120. In accordance with various disclosed embodiments, the content may be automatically updated in order to create a second set of updated content. Each portion of the original content may correspond to a respective application hosted by the application server 141.

As discussed herein the original content may be tagged with vectors, where the vector tags are utilized in order to detect when content is to be updated based on changes in the respective applications hosted via the application servers 141.

The content manager 130 is configured to update content based on changes in software applications as discussed herein. More specifically, the content manager 130 is configured to automatically detect triggers based on changes in applications hosted by the application servers 141 in order to determine when content among the content databases 142 is to be updated, and to automatically update part or all of the content when such a trigger is detected. To this end, the content manager 130 is configured to create vectors based on respective portions of content corresponding to applications and to tag the content using their respective vectors. These vectors may be compared to vectors representing subsequent versions of content for the same application in order to detect changes which trigger content updates.

The computing environment 140 may be a cloud computing environment or other environment in which software applications are deployed. In accordance with various disclosed embodiments, the software applications are hosted on the application servers 141, and software applications among the application servers 141 may have respective content stored in the content database 142. As noted above, the respective content for a given application may include video or other content demonstrating how to use the software application, how to navigate the software application, or otherwise guiding interactions with the software application in order to achieve a given user's goal.

Updates to the applications hosted by the application servers 141 may be pushed or otherwise uploaded to the application servers 141, thereby causing the applications to behave differently with respect to aspects represented in vector tags for the content. The differences in behavior may cause vectors created based on the updated software applications to indicate that the application (or a portion of the application) has changed and, consequently, that the respective content for that application (or portion of the application) is to be updated accordingly.

To this end, in accordance with various disclosed embodiments, the content manager 130 is configured to determine a comparison value (e.g., a diff) between a vector representing a portion of a content captured with respect to an application at an earlier time with a vector representing the same portion of content captured for the same application at a later time, and to determine whether the content is to be updated based on such a comparison value. As a non-limiting example, outputs of the updated applications may include visual differences with respect to placement or appearances of graphical user interface components whose positions and appearances are represented as values in vector tags for the respective content such that determining a comparison function value (e.g., a diff) between old and new versions of a vector for a given portion of content allows for detecting whether the application has changed in a manner that prompts content updating (e.g., if the diff value is above a threshold).

It should be noted that the computing environment 140 is depicted as a cloud environment and that only a single computing environment 140 is shown in FIG. 1 for simplicity purposes and without limitation on any of the disclosed embodiments. The computing environment 140 may be any computing environment in which application servers, content databases, or both, are deployed. Additionally, multiple computing environments may be utilized, with each of those computing environments including one or more application servers 141, one or more content databases 142, or both. Moreover, the content stored in content databases 142 deployed in one computing environment may be content illustrating usage of software applications hosted on application servers 141 deployed in another computing environment without departing from the scope of the disclosure.

It should also be noted that a single user device 120 is shown for simplicity purposes, but that multiple user devices may be used to create content, receive content, or both, without departing from the scope of the disclosure.

Figure 2:
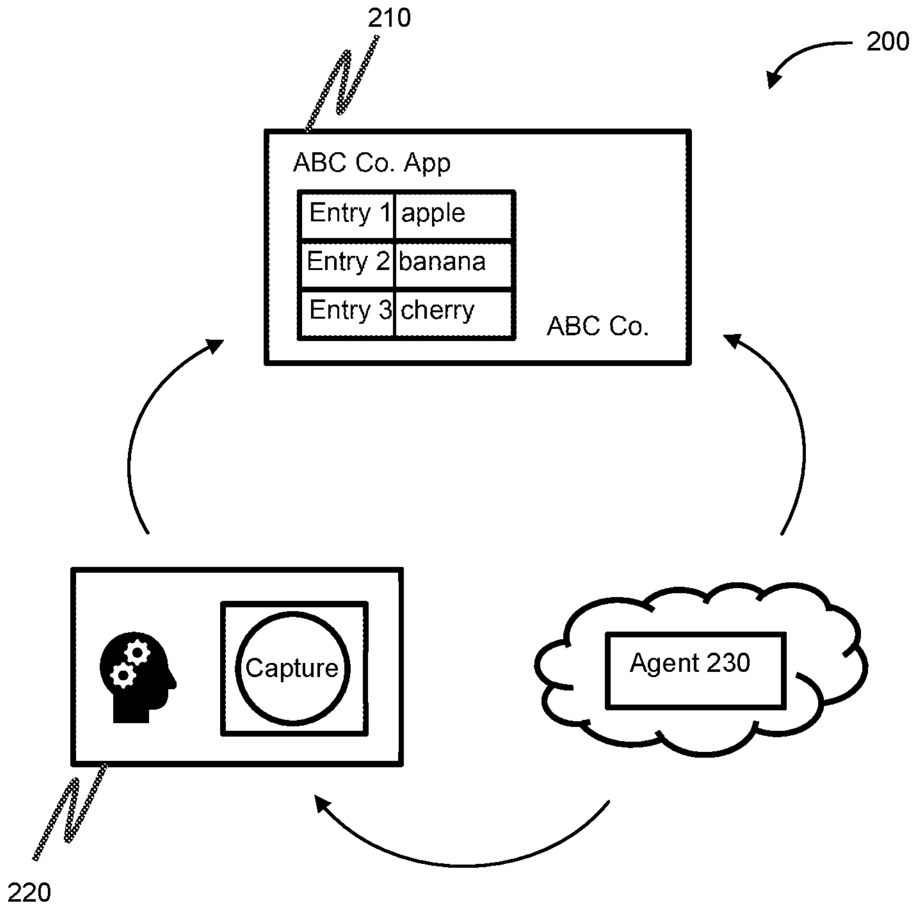
FIG. 2 is a diagram illustrating continuous updating of content for software applications.

FIG. 2 is a diagram 200 illustrating continuous updating of content for software applications. In an embodiment, the method is performed by the content manager 130, FIG. 1.

As depicted in the diagram 200, a target application 210 is the subject of content captured by a user 220 (e.g., a user of the user device 120 or other user who acts as a knowledge creator to create content with respect to the target application 210). As a non-limiting example, a user who works as a customer education team for customers of a company offering services via the target application 210 may capture content (e.g., by interacting with a "capture" button or other user interface element) while interacting with the target application 210 in order to video capture content showing use of the target application 210. Such video content may be used to show other users how to perform certain actions with respect to the target application 210.

As noted above, changes in an application such as the target application 210 can result in content captured by the user 220 becoming outdated or otherwise change the target application 210 such that any or all of the actions performed with respect to the target application 210 demonstrated in the content become irrelevant or otherwise fail to reflect the current state of the target application 210. As non-limiting examples of changes to the target application 210 which may cause part or all of the content to be unreflective of the current state of the target application 210, such changes may include certain actions no longer being possible (e.g., a button used to proceed to a next screen being missing), visual components displayed while running the target application 210 being relocated or visually altered, options or values being different or missing (e.g., options in a drop down box or hamburger menu), input options changing, combinations thereof, portions thereof, and the like.

An agent 230 or other program is configured to perform any or all of the disclosed embodiments with respect to the target application 210. To this end, the agent 230 may be configured to periodically replay a process performed by the user 220 while creating original version of content with respect to the target application 210, for example as described below with respect to FIG. 7. Moreover, the agent 230 may be configured to monitor for updates in the target application 210 which may prompt updating of the content, and to capture new content to be used for updating the content when such updates have been detected.

Further, when the agent 230 detects a change which prompts updating of the content, the agent 230 may send a notification to the user 220 indicating that the content has changed. The notification may further indicate which part or parts of the content have changed, recommend updating the content, or both.

Figure 3:
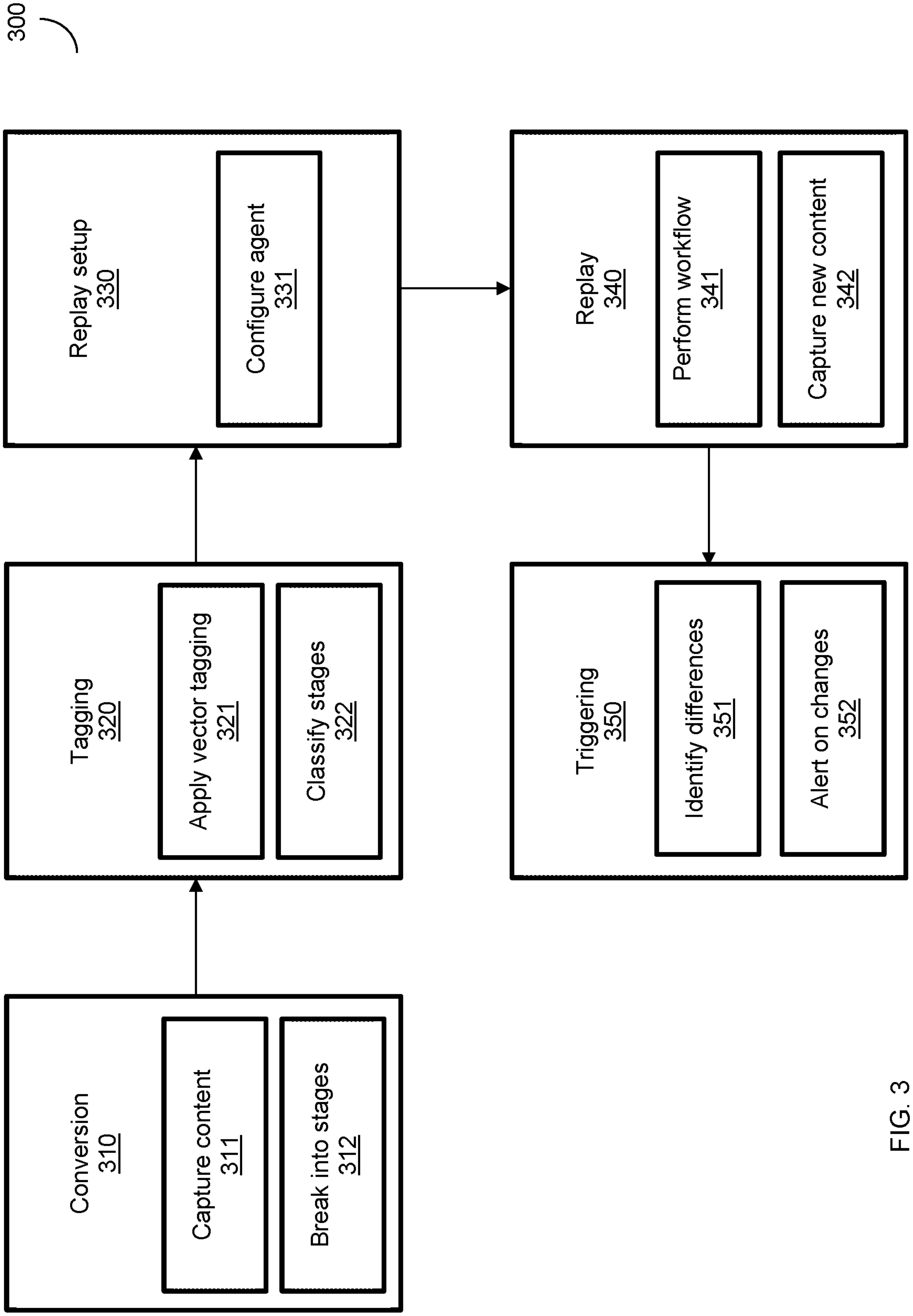
FIG. 3 is a flow diagram illustrating a content update trigger flow.

FIG. 3 is a flow diagram 300 illustrating a content update trigger flow.

As depicted in FIG. 3, content update triggering proceeds via conversion 310, tagging 320, replay setup 330, replay 340, and trigger 350. During conversion, content is captured at 311, and the captured content is broken into content stages at 312. A content stage is or includes a portion of content representing a portion of a workflow for using a given software application. Each content stage may show one or more interactions with interactive elements (e.g., icons or other user interface elements) in order to activate a part of the application or proceed to a next content stage defined with respect to the application (e.g., the next page of an application presented as web pages via a web browser). In other words, the content stages represent actions or other activities related to use of the application as demonstrated by the content.

Once the content has been broken into content stages at 312, flow continues with tagging 320. Specifically, vector tags are created and applied to the content stages at 321. The vector tags are created by embedding values representing certain aspects of the content into vectors. In particular, such aspects may include aspects related visual and textual components shown in video or image content such as, but not limited to, coordinates of visual or textual elements (e.g., coordinates defined with respect to a control point within a user interface projected while the software application is in use or coordinates defined with respect to a frame among the content), metadata of the software application being used as demonstrated by the content (e.g., metadata indicating a web domain of the software application), audio content (e.g., audio of a person's voice explaining the process while they are using the software application), a combination thereof, and the like. In an embodiment, each vector includes embedding values representing aspects of visual content, of software application metadata, and of audio content.

In order to support replaying simulations that accurately recreate the original environment in which the software application is run as demonstrated in the original content, the vectors used for tagging the content may further include values representing an operating system, a browser program (also referred to as a browser), dimensions (e.g., dimensions of windows in which output of the software application is displayed), a combination thereof, and the like. To this end, creating and applying the vector tags may include analyzing visual elements (e.g., presence or absence of certain visual elements, relative locations of visual elements, sizes of visual elements relative to each other or to a frame of the content, combinations thereof, etc.) in order to determine an operating system, browser, dimensions, a combination thereof, and the like. Values representing such determined operating system, browser, and dimensions may be included among the vectors and used for subsequent processing.

The vector tags are used to classify the content stages at 312. Specifically, the classifications may be used to indicate whether a given portion of content represents a meaningful event with respect to use of the application. The meaningful events may be or may include predetermined events or predetermined combinations of events, and more specifically events or combinations of events defined with respect to certain interactions with the software application as demonstrated in the content. As a non-limiting example, such a predetermined interaction event may be or may include interacting with a graphical user interface (GUI) element (e.g., clicking a button, selecting an option from a dropdown or hamburger menu, etc.). To this end, the classifications may be, but are not limited to, classifications representing whether such an event or combination of events has occurred (e.g., an "interaction event" classification and a "no interaction event" classification).

In this regard, it is noted that breaking the content down into content stages and then classifying the content stages allows for more efficiently identifying meaningful events such as interaction events than comparing content directly. As a non-limiting example, for video content, such an analysis may involve analyzing videos frame-by-frame such that each and every frame of the video is analyzed for interaction events and tagged. However, it has been identified that such an analysis is more granular than necessary to effectively represent meaningful interactions demonstrated in content which may be indicative of changes to the underlying software application such that tagging content with respect to stages can be performed more efficiently without sacrificing the ability to accurately represent meaningful events of the content.

Moreover, when content is to be compared (e.g., in order to detect differences between existing and new content as discussed herein), comparing tags only for content stages rather than for individual frames or other more granular portions of content allows for further reducing use of computing resources for such comparisons. As a non-limiting example, for a 5-hour long video, there may be around 30 interactions representing meaningful events shown in the content. Tagging the video frame-by-frame may require as many as hundreds of thousands of tags for such a video, while only tagging content stages with interactions may reduce the number of tags to be created and classified to dozens of tags.

After tagging 320, the flow continues with replay setup 330. During replay setup 330, an agent or other program is configured at 331 for remote replay. For example, the agent is configured at 331 in order to perform browser replay using a web browser to interact with the software application. In accordance with various disclosed embodiments, the agent is a headless browser program, i.e., a web browser without a graphical user interface. Such a headless browser program may be executed via a command-line interface or using network communication rather than through interacting with a graphical user interface of the target software application itself.

As part of configuring the agent at 331, the agent may be configured in order to effectively recreate the content. More specifically, the agent may be configured with the same operating system, browser program, dimensions for software application outputs, or a combination thereof, such that new content captured based on the agent's replay of the workflow of the original content would be the same or substantially similar to the original content as long as the underlying software application has not substantially changed. More specifically, in some implementations, the agent may be configured based on an operating system, browser, dimensions, or a combination thereof, represented in the vectors for the content. To this end, configuring the agent at 331 may include determining an operating system, browser, dimensions, or a combination thereof, of the device used to capture the content, either based on values among the vectors for the content or by analyzing visual elements (e.g., presence or absence of certain visual elements, relative locations of visual elements, sizes of visual elements relative to each other or to a frame of the content, combinations thereof, etc.).

As a non-limiting example, the agent may be configured in order to use the same operating system as was used to capture the original content (e.g., an operating system of a user device on which a user interacted with the software application in order to capture the content at 311). Visual elements in the content are analyzed with respect to predetermined presentations of visual elements for the software application when the software application is run using respective known operating systems. More specifically, visual elements or icons which are interactive like buttons or menus may be analyzed in order to determine an operating system for the original content, and the agent is configured at 331 with that operating system.

Configuring the agent in this manner effectively sets up the agent to reproduce the workflow represented in the content at replay 340. More specifically, by configuring the agent with the same operating system, browser, dimensions, and the like, as represented in the original content, new content captured by running the agent will be effectively comparable to the original content. If the agent were to be configured differently than the program used to create the original content, then content elements may be presented differently in the new content as compared to the corresponding content elements in the original content. This, in turn, would lead to falsely detecting differences in content representing changes to the underlying application. As a non-limiting example, the same button may appear in different locations depending on the operating system of the device used to interact with the software application. Thus, configuring the agent with the same operating system, browser, dimensions, or a combination thereof, allows for avoiding such false positives.

Once replay setup 330 is completed, flow proceeds to replay 340. During replay 340, the agent is run at 341 in order to simulate a workflow represented in the content captured at 311. More specifically, the agent may be run at 341 in order to simulate a user interacting with the software application in order to replay each of the interaction events identified via classification at 322.

In order to facilitate the replay 340, the original content is analyzed in order to identify code-triggering content elements represented in the original content. The code-triggering content elements may be or may include graphical user interface elements such as buttons or menus which, when interacted with, trigger execution of certain portions of code of the software application. To this end, 340 may include identifying content elements and comparing the content elements to predetermined content elements known to trigger lines of code for the software application. Based on such a comparison, code to be run or otherwise triggered by the agent is identified and used for running the simulation at 341 such that the simulation attempts to recreate the workflow represented in the original content.

Results of performing the workflow at 341 are captured as new content at 342. As discussed herein, the new content may be tagged using vectors and compared to vectors of existing content (e.g., the content captured at 311) in order to identify differences in content representing changes in the underlying software application which may prompt updating the content.

For example, when an interactive element that appears in the existing content has moved, has been removed, or has otherwise changed in a manner that changes how the software application must be interacted with in order to proceed to a next action or activity, the software application may have changed in a manner such that new content should be captured for at least the stage including this interactive element. As a non-limiting example, when a button used to proceed to the next part of the software application has been removed and replaced with a dropdown menu, a portion of content showing pressing the button could be replaced with a portion of content showing selecting an option from the dropdown menu.

Using the new content captured at 342, flow proceeds with triggering 350. During triggering 350, differences between the original content captured at 311 and the content captured at 342 are determined. For example, such differences may be determined based on a differential function (diff) calculated using the respective vectors or portions of the respective vectors for corresponding portions of the original and new content. In some embodiments, if a diff value calculated this way between corresponding portions of original and new content is above a threshold, a difference is identified at 351. Such a difference is indicative that the underlying software application has changed and may therefore be utilized as the trigger for detecting a change in the software application.

When such a change has been detected, a user may be alerted of the changes at 352. To this end, 352 may include sending a notification to a user device (e.g., the user device 120, FIG. 1) in order to alert the user of potential changes which may prompt the user to update the content. Such a notification may further indicate which portions of the content have changed (e.g., which portions had a diff value above a predetermined threshold).

Figure 4:
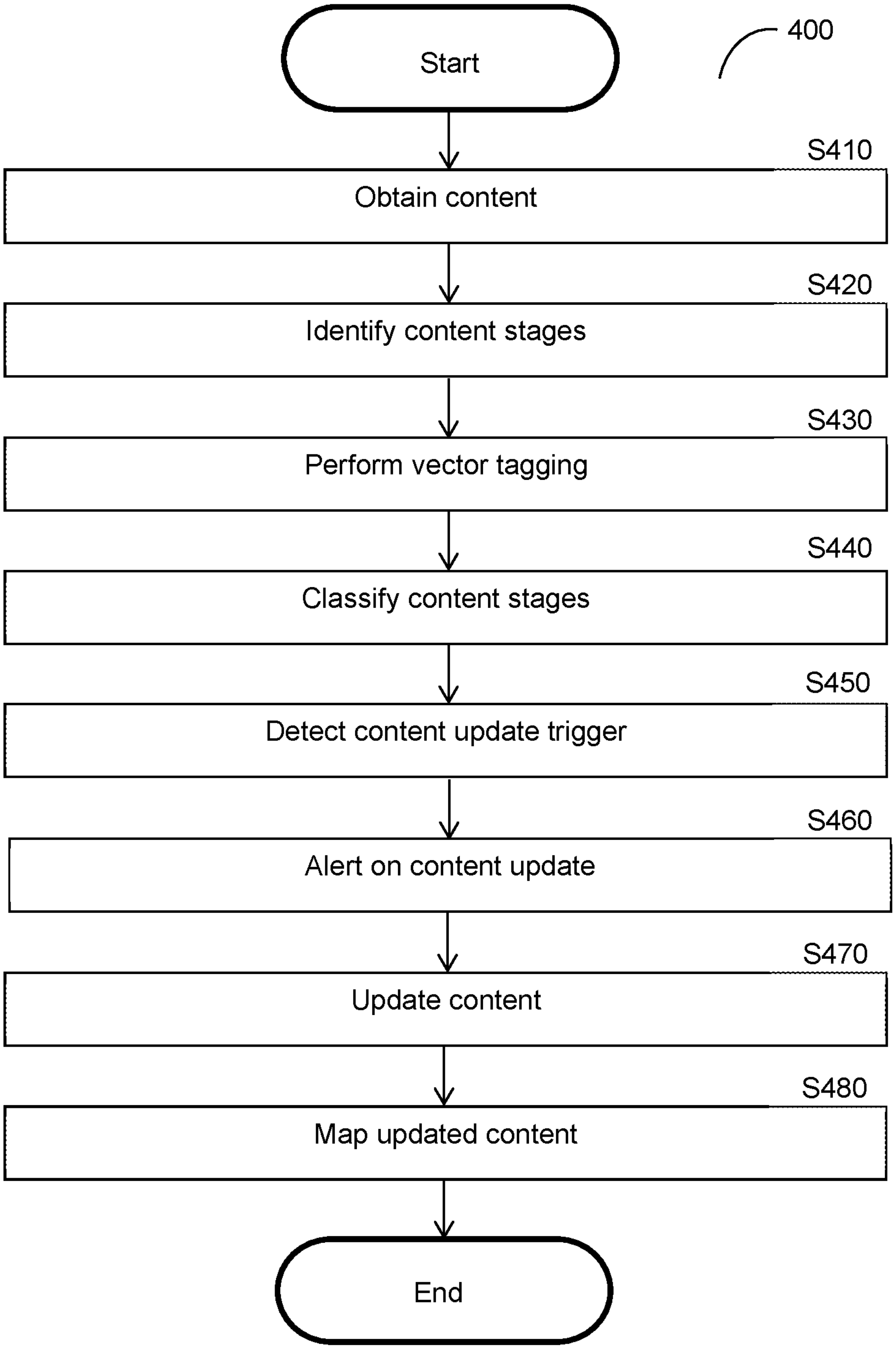
FIG. 4 is a flowchart illustrating a method for updating content according to an embodiment.

FIG. 4 is a flowchart 400 illustrating a method for updating content according to an embodiment. In an embodiment, the method is performed by the content manager 130, FIG. 1.

At S410, content is obtained. More specifically, in accordance with various disclosed embodiments, the content is captured while using or otherwise interacting with a target software application such that the content represents use of the target software application. To this end, in an embodiment, S410 further includes identifying the target software application for the content by analyzing metadata of the content, audio or text of the content, or both, in order to identify an identifier of the target software application. The content may be or may include, but is not limited to, video, images, text, a combination thereof, and the like. In an embodiment, the content obtained at S410 is a first set of content including one or more videos, images, or other content items demonstrating a workflow for using a software application.

At S420, content stages within the content are identified. Each content stage is a portion of content representing a respective part of a workflow for using the target software application. To this end, each content stage may show or otherwise demonstrate one or more interactions with interactive elements (e.g., icons or other user interface elements) in order to activate a part of the application or proceed to a next content stage defined with respect to the application (e.g., the next page of an application presented as web pages via a web browser).

The content stages may be identified based on breaks in the content obtained at S410. For example, the content obtained at S410 may be received as multiple sets of content, with each content captured by a user in order to represent a given content stage. Each such portion of content may be tagged or otherwise have metadata indicating that the portion of content represents a content stage. Alternatively, the content stages may be identified based on timestamps or other temporal markers within the content or in metadata associated with the content which marks different stages among the workflow.

At S430, vector tagging is performed with respect to the content stages. In an embodiment, S430 includes analyzing content elements of the content stages and creating an embedding including values representing different aspects of the content for each stage, information about the content for each stage, or both. In particular, the embedding includes information which may be used to determine changes in software applications that manifest as changes to content. To this end, in a further embodiment, the embedding at least includes coordinates of content elements, and S430 includes identifying such coordinates relative to a control position.

In this regard, it has been identified that relative coordinates of certain content elements, and in particular application control elements which allow for controlling the application when interacted with, provide an efficient but accurate method of detecting changes in the application. These control elements may be realized as interactive elements or icons such as, but not limited to, buttons, menus, switches, tabs, checkboxes, fillable fields, sliders, combinations thereof, portions thereof, and the like.

More specifically, appearances (or lack thereof) of these application control elements within the content tend to vary significantly when the application has changed in a manner that affects how the application is used. Accordingly, using such coordinates or other features related to appearance of control elements within the content allows for effectively representing aspects of the content which demonstrate changes in the underlying application while minimizing the number of values needed to be tracked and compared. In other words, the amount of data needed to be stored and processed while accurately representing change-relevant portions of the content can be minimized by leveraging coordinates, thereby conserving computing resources.

Additionally, as noted above, by performing vector tagging with respect to content stages rather than frame-by-frame or otherwise tagging each more granular portion of the content, the amount of computing resources needed to both perform tagging and to compare tags in order to detect changes is reduced.

An example process for performing vector tagging is described further below with respect to FIG. 5.

At S440, the content stages are classified. In an embodiment, S440 includes analyzing content of each content stage in order to identify interactive elements (e.g., buttons or menus) shown in the content as well as interactions (e.g., via moving a mouse cursor or highlighter) with those interactive elements, and content stages demonstrating interactions with interactive elements may be classified as interaction events while content stages which do not demonstrate such interactions may be classified as not interaction events.

In this regard, the classifications may serve to effectively indicate whether each content stage demonstrates a meaningful event with respect to using the application. As discussed herein, for content demonstrating how to use a given application, events such as interactions with interactive elements are meaningful in that they represent notable actions for using the application such that differences in content elements used for performing these actions may be indicative of changes in the application which may require new content in order to effectively demonstrate the new actions.

In some embodiments, the classification is performed based on one or more additional analyses of the content and, in particular, analysis of audio associated with the content. To this end, in some such embodiments, S440 may include applying a voice-to-text model configured to translate audio speech into text, where the speech includes speech by a person describing use of the application such that the resulting text also describes how the application is being used as demonstrated in the content. The text may be analyzed, for example, in order to identify predetermined key words or phrases known to be associated with transitions in using the content. As a non-limiting example, phrases such as "now we proceed to the next step," "after this step is complete," and the like.

In another embodiment, S440 includes querying a vision-based generative artificial intelligence (GenAI) model trained to answer questions related to visual content, and the classification may be based further on the outputs of the GenAI model. As a non-limiting example, a large language model (LLM) trained to analyze images or to communicate with another model trained to analyze images in order to identify predetermined signs of potentially meaningful events in content such as, but not limited to, transitions, mouse movements toward interactive elements (e.g., moving a mouse toward and hovering the mouse cursor over a button), combinations thereof, and the like.

At S450, a content update trigger is detected. In an embodiment, detecting the content update trigger may include comparing a second set of content to the first set of content with respect to the vectors (i.e., the embeddings). In a further embodiment, the second set of content is a new set of content captured by simulating a workflow demonstrated in the original (first set of) content. To this end, detecting the content update trigger may further include creating vector embeddings for the new content, and comparing the new content vectors to the original content vectors.

When a difference between respective vectors is above a threshold, a content update trigger may be detected. Moreover, in at least some implementations, multiple content update triggers may be detected when the vectors for multiple portions of content (e.g., content of multiple content stages) each differ above a threshold. An example process for detecting content update triggers is described further below with respect to FIG. 7.

At S460, a content update alert is generated when a content update trigger has been detected. In an embodiment, S460 includes generating and sending a notification indicating that the target software application has changed in a manner which may require updating the corresponding content demonstrating use of the target software application.

At optional S470, the content is updated. The content may be updated using new content provided by a user (e.g., a user of the user device 120, FIG. 1), for example, by inserting one or more new portions of content to replace portions of content stages which triggered content updates. Moreover, new content captured while simulating the workflow of the original content may be provided to the user for updating, for example, by providing the content to allow the user to record new accompanying audio to explain the updated portions of content.

At optional S480, the updated content may be mapped. More specifically, the updated content may be mapped and indexed with respect to the Internet and, in particular, with respect to web locations of the target software application whose use is demonstrated in the content. An example process which may be utilized to map the content is described further below with respect to FIGS. 8-9.

Figure 5:
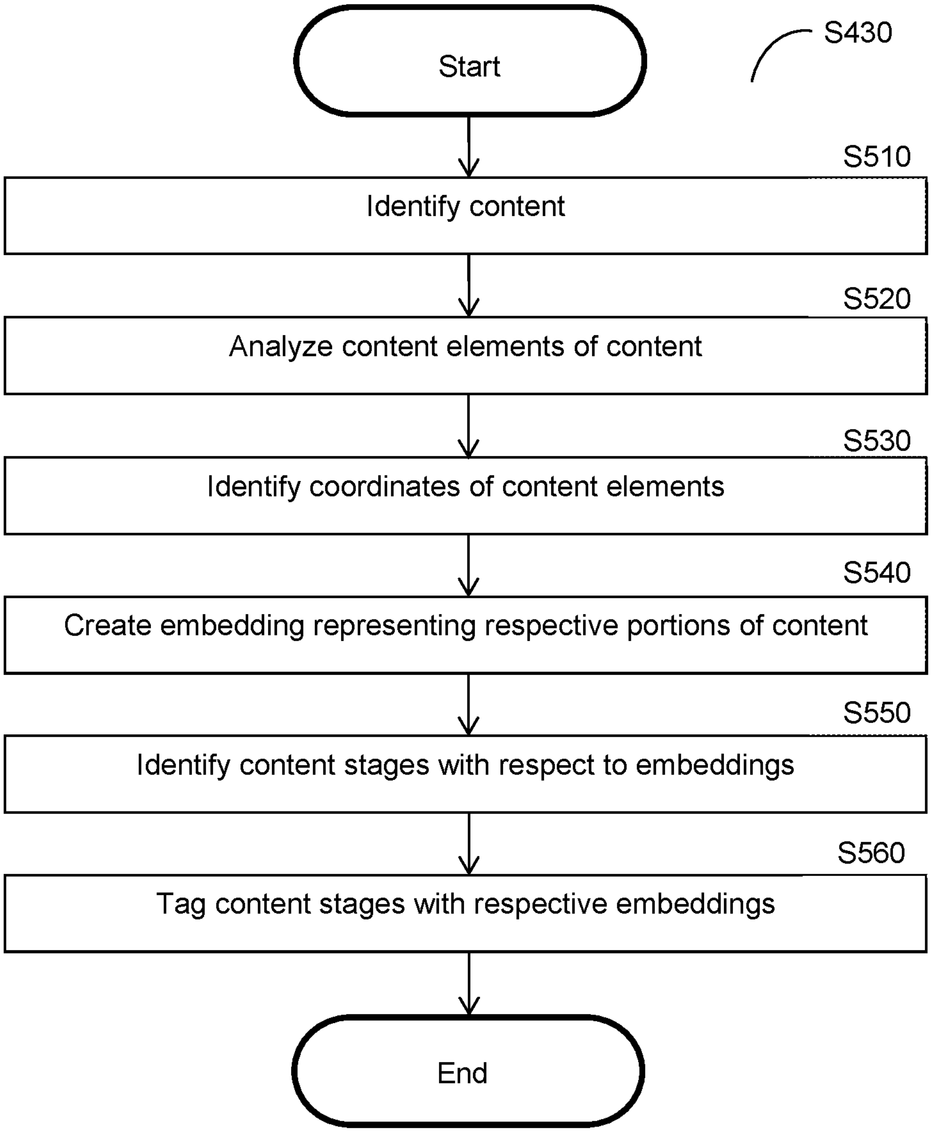
FIG. 5 is a flowchart illustrating a method for vector tagging according to an embodiment.

FIG. 5 is a flowchart S440 illustrating a method for vector tagging according to an embodiment.

At S510, content to be tagged is identified. The content may be original content to be monitored for changes, or may be new content to be used for detecting such changes via comparison to the tags of the original content.

At S520, content elements of the content are analyzed. The analyzed content elements may include user interface elements (e.g., GUI elements) or other elements which may be output by the software application in response to interactions with the software application such as, but are not limited to, visual elements, textual elements, both, and the like. In an embodiment, the content elements are analyzed in order to determine sizes, shapes, colors, other visual features, text, combinations thereof, and the like, of the respective content elements. Such visual features and text may be used to identify placement of the content elements relative to the overall content, to determine when content elements have been changed or replaced (e.g., replacing a button with a menu), determine which content elements are potentially interactable elements (e.g., by comparing visual and textual characteristics of the content elements to predetermined visual and textual characteristics of known interactive content elements), combinations thereof, and the like.

At S530, coordinates of the content elements are determined. The coordinates may be, for example but not limited to, (X, Y) coordinates expressed with respect to a control point within a browser window or other GUI showing the content elements. As discussed herein, movement or removal of content elements from certain coordinates, and in particular of content elements which are interactive, may indicate changes which should prompt recording new content (as new interactions will need to be shown in order to effectively demonstrate using the content after such changes) such that determining the coordinates of the content elements allows for tracking such changes in placement of the content elements to aid in detecting differences in content indicative of changes to the underlying target software application.

At S540, an embedding is created for respective portions of the content. Each embedding may be composed of a set of embedding values representing respective aspects of the content, information about the content, or both. The embedding values of each embedding may be organized into a vector such that the resulting vector embedding (also referred to as simply a vector) acts as a quantifiable and mathematically operable representation of the respective portion of content.

In some embodiments, the embedding for a given portion of content may further include values representing potential event indicators provided by one or more software application analytics metrics tools monitoring use of the application. Such tools may be configured to identify certain kinds of interaction events with respect to using an application such as, but not limited to, path state change, flow transitions, certain event controls, user personas, combinations thereof, and the like. Any or all of such analytics metric tool information may be represented as values in the embedding and in order to aid in allowing the vector embeddings to represent interactions with the application represented in the content.

At S550, content stages are identified with respect to the embeddings. More specifically, for each embedding, a content stage including the content for which the embedding was created is identified. The identified content stages are tagged with the embeddings of the respective content within those content stages.

At S560, the content stages are tagged with respective embeddings, for example, with embeddings of portions of content from each content stage. The tagging results in each content stage having one or more vector tags, with each vector tag including a vector of embedded values representing a respective portion of content from the tagged content stage.

Figure 6:
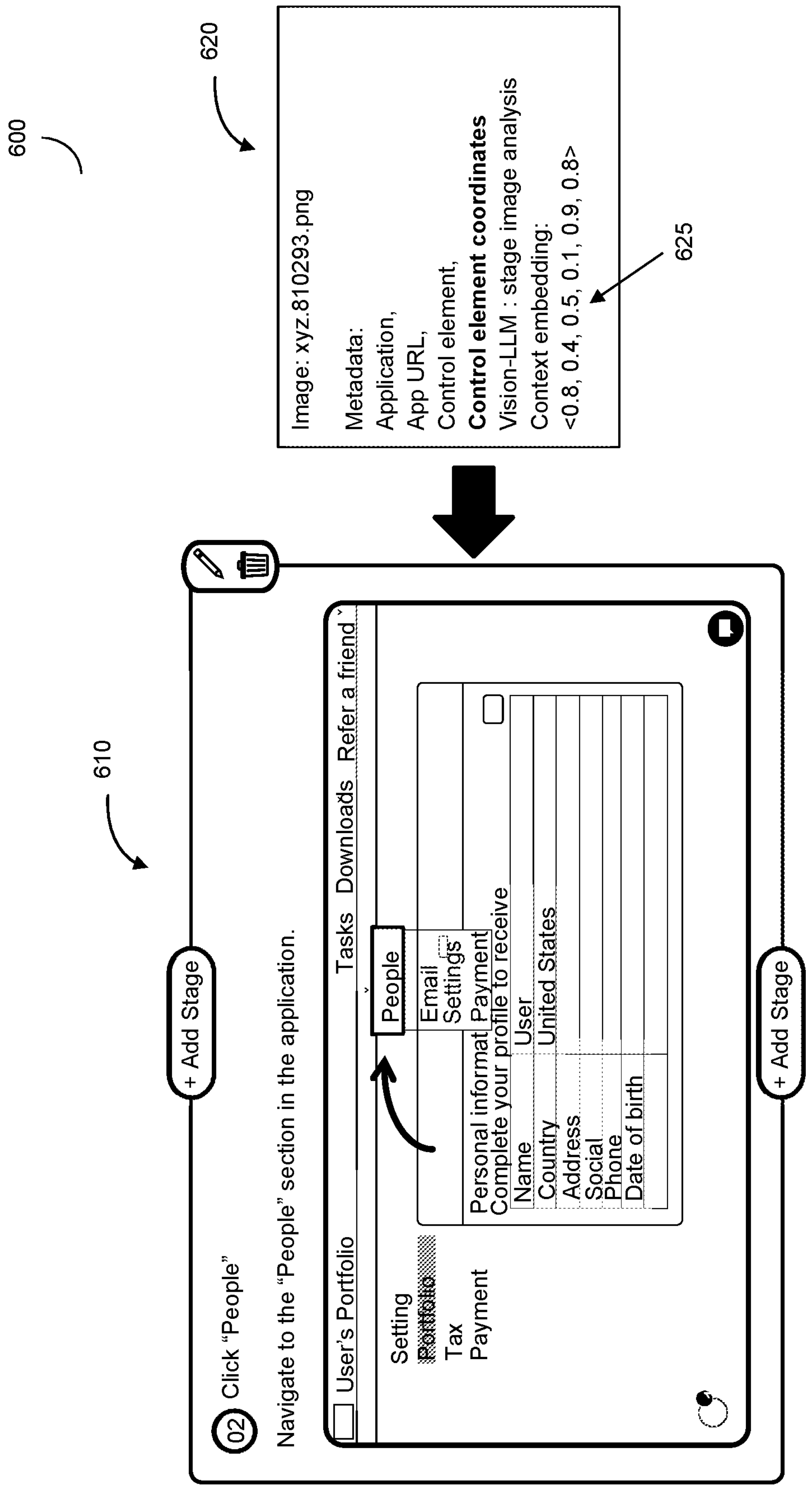
FIG. 6 is a diagram utilized to illustrate vector tagging in accordance with at least some disclosed embodiments.

FIG. 6 is a diagram 600 utilized to illustrate vector tagging in accordance with at least some disclosed embodiments.

As depicted in FIG. 6, a frame 610 of video content demonstrates use of a software application and, in particular, illustrates a particular interaction in the form of clicking "People" in a dropdown menu. When the content is broken into stages, the frame 610 may be utilized as representing the content stage including clicking on the "People" option.

In order to create a vector for this content stage, the frame 610 is analyzed with respect to visual elements and metadata of the software application is analyzed. As shown in FIG. 6, the result is a set of values 620 representing aspects of the elements of the content and the metadata. These values are embedded into a context embedding 625. In the non-limiting example shown in FIG. 6, the resulting context embedding 625 is realized as the vector "<0.8, 0.4, 0.5, 0.1, 0.9, 0.8>."

Figure 7:
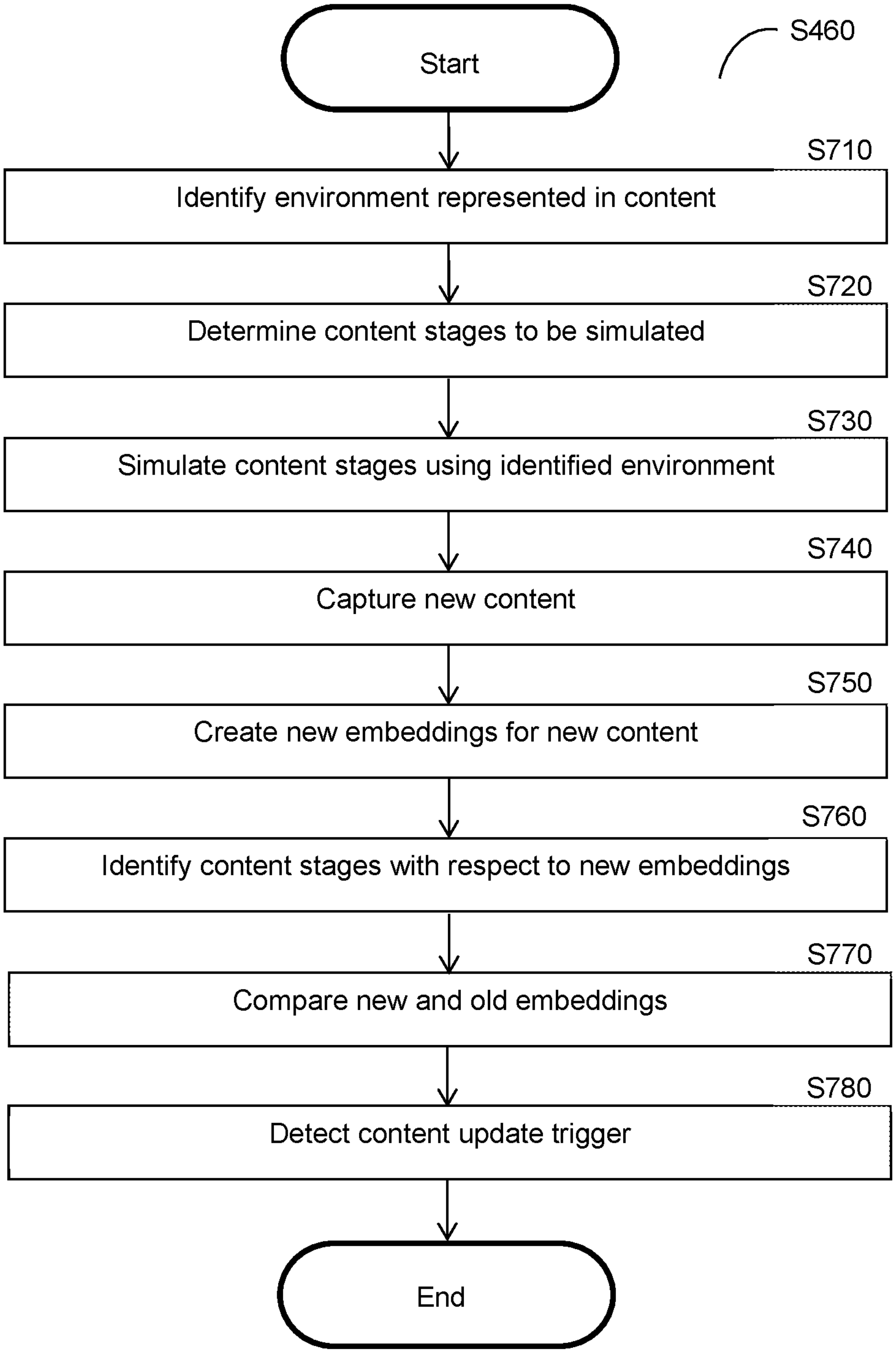
FIG. 7 is a flowchart illustrating a method for detecting content update triggers according to an embodiment.

FIG. 7 is a flowchart S460 illustrating a method for detecting content update triggers according to an embodiment.

At S710, one or more aspects of an environment represented in original content are determined. Specifically, the aspects of such an environment may be or may include systems, programs, settings, or a combination thereof. In an embodiment, the aspects of the environment include any or all of operating system, browser, and window dimensions.

In an embodiment, S710 includes analyzing the content in order to identify predetermined content elements that are known to indicate aspects of the environment, to identify predetermined locations of content elements that indicate such known aspects (e.g., relative locations of content elements indicating particular window dimensions), both, and the like.

At S720, content stages to be simulated are selected. The content stages to be simulated may be or may include content stages of the original content. More specifically, the content stages to be simulated may be content stages demonstrating interaction events, for example, as indicated by the classifications determined as described above with respect to S440.

At S730, the selected content stages are simulated using the identified environment. More specifically, the selected content stages are simulated in order to replay or otherwise recreate a workflow demonstrated in the original content.

In an embodiment, simulating the workflow includes replaying actions demonstrated in the original content, for example interacting with application control elements in the form of interactive user interface elements like buttons and menus, and interacting with those control elements in the same manner as demonstrated in the original content (e.g., selecting the same option in a menu or setting a slider to the same value).

In an embodiment, the simulation is performed using an agent or other program configured to access the software application using other programs and settings that simulate the environment used to capture the original content. As noted above, this allows for avoiding false positive identifications of differences in content which are caused by differences in environment (e.g., due to different sizes or appearances of content elements for the same application) rather than differences in the underlying application itself. Such an environment may include a particular operating system, browser, window dimensions, or a combination thereof. As a non-limiting example, when video content was created using an operating system "BrandOS," using a browser program "BrandBrowse," and using window dimensions 1000 pixels by 500 pixels, the agent may be configured to access the application by running "BrandBrowse" on a computing environment using "BrandOS" with window dimensions set to 1000 pixels by 500 pixels.

To this end, in a further embodiment, S730 includes analyzing the content for content elements which are indicative of the environment in which the target software application is run. In yet a further embodiment, S730 further includes comparing content elements among the content to predetermined content elements known to be associated with respective environments (e.g., versions of content elements which are known to appear when using certain operating systems, browsers, or combinations thereof, at certain dimensions). Moreover, S730 may also include determining dimensions of the browser window based on known dimensions of those content elements for respective browser window sizes. Once the aspects of the environment are determined in this manner, the agent may be configured accordingly in order to effectively recreate the original content (assuming that the application has not changed in a manner that manifests in content).

In accordance with various disclosed embodiments, the simulation may be performed in the background using a headless browser, i.e., a web browser without a graphical user interface. To this end, S450 may include submitting commands to be executed via command-line interface or other network communication rather than interacting with a graphical user interface in order to realize the replay. In a further embodiment, S450 includes determining the commands to be sent for execution by the software application based on the analysis of the content elements.

At S740, new content is captured based on the results of the simulation. Specifically, outputs of the software application may be obtained and utilized to create new content demonstrating those outputs. As a non-limiting example, new video content may be created showing the steps performed during the simulation.

At S750, embeddings are created for the new content. The embeddings may be created as discussed further above with respect to FIG. 5. The embeddings may be organized into vectors, with each vector including a set of values representing respective aspects of the embedding (which, in turn, represent respective aspects of the content or information about the content for a given content stage).

At S760, content stages of the new content are identified with respect to the embeddings created for the new content. More specifically, the content stages may be identified as content stages including the portions of content for which the embeddings are created. That is, an embedding created based on a portion of content belonging to a particular content stage is used to identify that content stage as the content stage corresponding to the embedding.

At S770, the new content embeddings are compared to original content embeddings. More specifically, embeddings representing the same content stages may be compared between the new content and the original content. In an embodiment, S770 includes determining a differential (diff) value by applying a diff function to vectors including the new and original content embedded values. Such a diff function calculates a distance between vectors and therefore is indicative of a degree of difference between the respective portions of content.

At S780, a content update trigger is detected based on the comparison. In an embodiment, a content update trigger is detected when differences between the new and original content embeddings are above a threshold. In a further embodiment when the comparison at S770 includes determining a diff value between respective content stages of the new and original content, a content update trigger is detected when the diff value determined for a given content stage is above a predetermined threshold. Multiple content update triggers may be detected, for example, when vector embeddings of multiple content stages have diff values above the threshold. Each content update trigger may therefore not only represent that the software application shown in the content has changed, but that the portion of the application demonstrated by the content stage whose diff value triggered detection of a content update may have changed such that a new portion of content may be appropriate.

It should be noted that the steps of FIG. 7, and in particular steps S730 and S740, are depicted sequentially for purposes of discussion, but that at least some steps may be performed in parallel without departing from the scope of the disclosure. For example, new content may be captured at S740 as the simulation performed at S730 proceeds rather than after such simulation has ended without departing from the scope of the disclosure.

Figure 8:
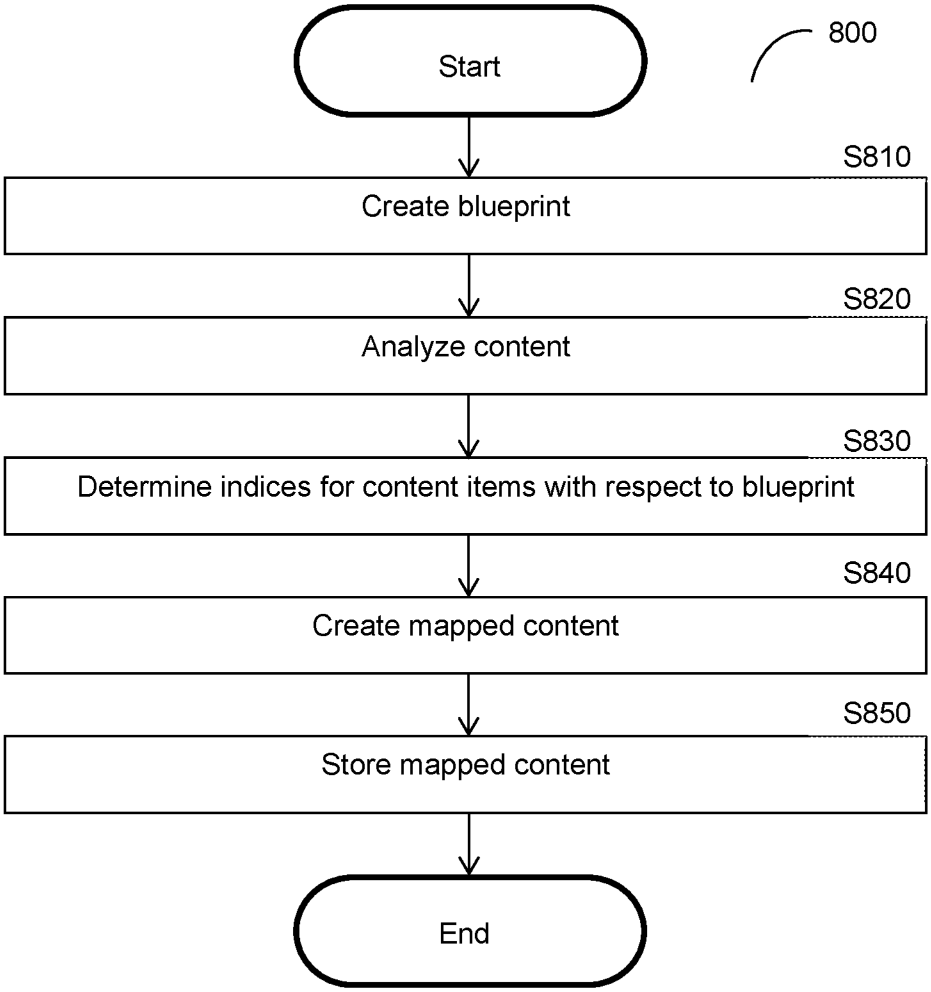
FIG. 8 is a flowchart illustrating a method for providing application-relevant content using Internet-based mapping according to an embodiment.

FIG. 8 is a flowchart 800 illustrating a method for providing application-relevant content using Internet-based mapping according to an embodiment. In an embodiment, the method is performed by the content manager 130, FIG. 1. In another embodiment, the method may be performed by a content provider system (not shown), which may include any or all of the components discussed below with respect to FIG. 10.

At S810, a blueprint is created. The blueprint at least includes a web-based mapping which maps discrete portions of an application to respective Internet locations. In an embodiment, the blueprint is created at least partially as described below with respect to FIG. 9.

At S820, multimedia visual content (MMVC) to be mapped with respect to the blueprint is received. The multimedia visual content may include, but is not limited to, video, images, portions thereof, combinations thereof, and the like. In an embodiment, S820 includes at least machine vision analysis of the multimedia content. Further, S820 may include identifying video frames within video content and analyzing the identified video frames.

More specifically, the analysis is a web-based analysis to identify an application as well as web-relevant characteristics of the application demonstrated in the multimedia visual content. To this end, in an embodiment, S820 includes using a frame-by-frame visual analysis in order to identify the application being used in each discrete portion of the multimedia visual content and where the user is interacting with that application. Such analysis may be performed as described herein above with respect to FIG. 9 and, more specifically, S930.

In a further embodiment, analyzing the multimedia visual content may further include analyzing audio (e.g., audio of videos among the multimedia visual content). In yet a further embodiment, the audio (or a transcript created for the audio) may be analyzed using natural language processing in order to recognize concepts indicated in the audio which may be relevant to the application or portions thereof. The transcript may be further analyzed for potential key words which relate to portions of the blueprint.

At S830, indices for multimedia visual content elements or other portions of the multimedia content are determined with respect to locations within the blueprint based on the analysis of the multimedia visual content. As a non-limiting example, video frames may be indexed with respect to the blueprint.

The indices are determined at least based on the application and the locations where the user interacted with the application determined via the analysis of the multimedia visual content. The application may be identified using applicant-relevant information, and the locations where the user interacted with the content correspond to particular web-based locations related to the location of the application within the Internet, locations within the application, or both.

In an embodiment, if a corresponding index cannot be determined for a particular portion of the multimedia visual content, the blueprint may be updated based on the multimedia visual content received at S820. Consequently, the blueprint may be updated using new multimedia visual content that may not correspond to any portions of the application encountered during prior navigation used to complete the blueprint. Updating the blueprint in this way may include, but is not limited to, retrieving web information based on the multimedia visual content. As non-limiting examples, the location pointed to by a URL shown in the multimedia visual content may be navigated to, and components of the web page (e.g., HTML code) may be analyzed in order to identify web objects and application-relevant information. Based on the analyzed web page components, connections to existing portions of the blueprint as well as internal connections within the web page may be unearthed and used to update the mapping in the blueprint accordingly.

At S840, mapped content is created. The mapped content includes at least the multimedia visual content, separated into segments (e.g., segments including sets of video frames) and indexed with respect to portions of the blueprint. In a further embodiment, the mapped content may include any transcripts associated with the multimedia visual content of the mapped content, tags for the multimedia visual content of the mapped content, both, and the like. The tags may be created based on the blueprint, for example, based on application-related data discovered during navigation.

In some implementations, creating the mapped content may further include generating translation data providing translations of the mapped content. This allows for providing multilingual content on demand. To this end, S840 may include creating translations, e.g., by providing multiple transcripts, audio files, visual content, or combinations thereof, which provide the same information in different language. As non-limiting examples, such translations may include any of a transcript written in a different language from the original transcript, an audio file with audio created using a text-to-speech function in a language that is different from the language of the original transcript, video with subtitles based on a translated transcript, and the like.

At S850, the mapped content is stored in a database (e.g., one of the content databases 142 FIG. 1) for subsequent use. Once stored, the mapped content can be accessed as needed by identifying a relevant portion of an application being used and determining a corresponding location in the blueprint. Each portion of mapped content, which is indexed with respect to the blueprint, will be associated with a corresponding portion of the blueprint such that the mapped content for the relevant portion of the application being used can be retrieved. Accordingly, the mapped content can act as a playbook providing on demand knowledge relevant for particular applications, and can further communicate knowledge related to specific components of applications (e.g., specific functions of applications, specific services rendered by applications, etc.).

Figure 9:
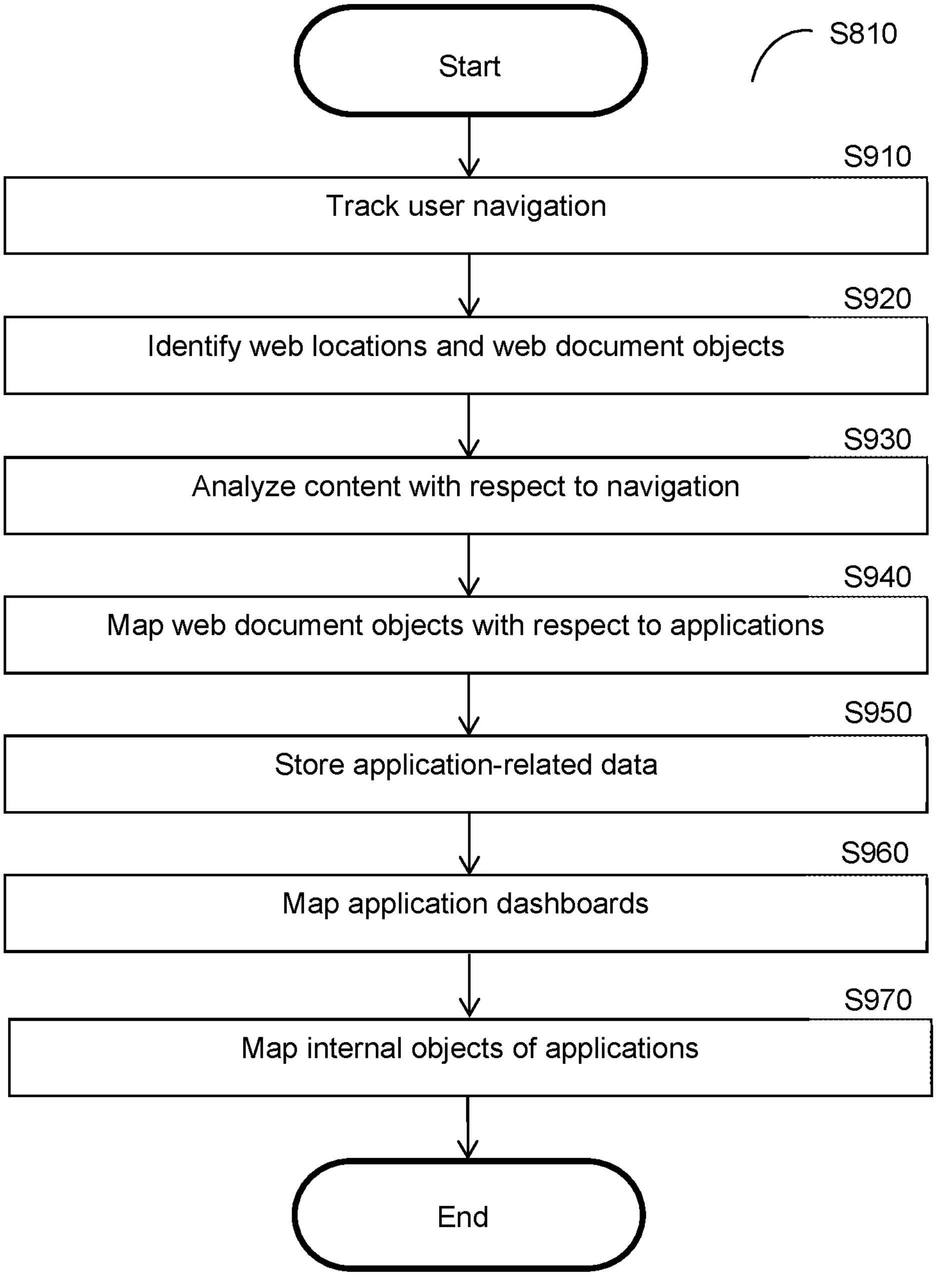
FIG. 9 is a flowchart illustrating a method for creating a blueprint including web-based mapping according to an embodiment.

FIG. 9 is a flowchart S810 illustrating a method for creating a blueprint including web-based mapping according to an embodiment.

At S910, user navigation is tracked as users navigate through web pages and, in particular, through web pages including web pages used for providing services of software applications. In an embodiment, S910 includes collecting web-based data for locations encountered during the navigation. The web-based data indicates locations on the World Wide Web, objects in those locations, or other information related to potential Internet locations or sub-locations to be used for mapping with respect to the Internet. Such web-based data may include, but is not limited to, uniform resource locators (URLs), tokens, hypertext markup language (HTML) elements, and the like.

At S920, web locations and web document objects encountered during the navigation are identified based on the web-based data collected at S910. In an embodiment, S920 further includes identifying connections among such web locations and web document objects. As a non-limiting example, connections between web locations may include the presence of links in one web location containing URLs pointing to other web locations. As another non-limiting example, connections between web objects may include references in one web object to one or more other web objects, calls to other web objects or portions thereof, combinations thereof, and the like. Such connections may be used to further improve the granularity of the resulting blueprint, thereby allowing for more accurately providing content thereafter. Alternatively or in combination, the connections may be used to recommend content for related web pages that may be of interest to a user using an application with respect to a given application location.

At S930, multimedia visual content is analyzed with respect to the locations encountered during the navigation. More specifically, the analysis is a web-based analysis to identify web-relevant characteristics of the application demonstrated in the multimedia visual content. In an embodiment, S930 includes using a frame-by-frame visual analysis in order to identify the application being used in each discrete portion of the multimedia visual content and where the user is interacting with that application.

The application being used may be determined based on characteristics such as, but not limited to, text shown in the multimedia visual content, tags associated with the multimedia visual content, audio of the multimedia visual content (e.g., a name of an application spoken during recording of a video), logos or other visual identifiers associated with particular applications shown in the multimedia visual content, combinations thereof, and the like. To this end, in some implementations, S930 may further include performing natural language processing based on the audio or based on a text-based transcript associated with the multimedia visual content.

Where the user is interacting with the application may be determined based on visual indicators of user gestures with respect to portions of the application that are shown in the multimedia visual content such as, but not limited to, a mouse cursor or other visual pointer, a highlighted or other differently colored area, a flash of light or other visual indicator of a press on a touch screen, combinations thereof, and the like. Identifying where users interact with applications in addition to the applications being used themselves allows for more granularity mapping of discrete portions of applications, thereby improving the accuracy of the index and any content provided using the blueprint.

At S940, the web document objects are mapped with respect to the application based on the analysis of the multimedia visual content. In an embodiment, S940 may include correlating between where the user interacted with the application and web document objects accessed during navigation, for example based on time stamps or interaction and access order. This, in turn, allows for identifying discrete portions of applications with which a user may interact that should therefore be indexed in the blueprint.

At S950, application-related data is stored. The application-related data may include, but is not limited to, name, domain, logo, combinations thereof, and the like. In some implementations, the application-related data may be stored as another layer of the blueprint (i.e., as another layer of mapping in addition to the web-based mapping layer). The application-related data may be utilized to tag the multimedia visual content or otherwise to provide additional granularity of searchable data within the blueprint in order to provide more accurate search results based on search queries.

At optional S960, application dashboards are mapped. The application dashboards are dashboard web pages associated with respective URLs. The application dashboards may be mapped with respect to dashboard settings such as, for example, authentication settings. In an example implementation, the application dashboard mapping is added as another layer to the blueprint.

At optional S970, internal objects of applications are mapped. The mapping of internal application objects may be created based on interactions with the application web pages. In an example implementation, the internal objects mapping is added as another layer to the blueprint.

It should be noted that FIG. 9 is depicted as a single step of the method of FIG. 8 merely for simplicity and without limitation on the disclosed embodiments. In various implementations, the steps of FIG. 9 may be performed continuously such that the blueprint is continually updated while in use, for example in real-time as users navigate through software applications. Alternatively, the method of FIG. 9 may be performed iteratively without departing from the scope of the disclosure.

It should also be noted that FIG. 9 is described with respect to creating a blueprint with respect to a single application such that different blueprints provide mapping for different applications, but that multiple applications may be mapped via a single blueprint without departing from the scope of the disclosure.

Figure 10:
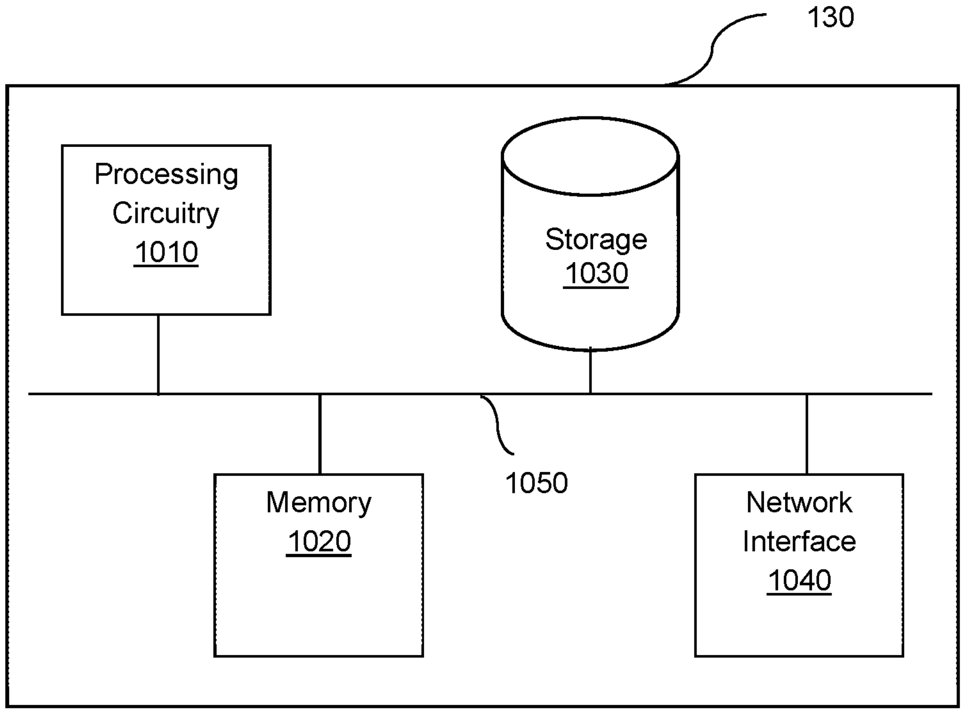
FIG. 10 is a schematic diagram of a content manager according to an embodiment.

FIG. 10 is an example schematic diagram of a content manager 130 according to an embodiment. The content manager 130 includes a processing circuitry 1010 coupled to a memory 1020, a storage 1030, and a network interface 1040. In an embodiment, the components of the content manager 130 may be communicatively connected via a bus 1050.

The processing circuitry 1010 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1020 may be volatile (e.g., random access memory, etc.), non-volatile (e.g., read only memory, flash memory, etc.), or a combination thereof.

In one configuration, software for implementing one or more embodiments disclosed herein may be stored in the storage 1030. In another configuration, the memory 1020 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1010, cause the processing circuitry 1010 to perform the various processes described herein.

The storage 1030 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 1040 allows the content manager 130 to communicate with, for example, the user device 120, the application servers 141, the content databases 142, and the like.

It should be understood that the embodiments described herein are not limited to the specific architecture illustrated in FIG. 10, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting content updates, comprising:

creating a plurality of first embeddings based on a first set of content demonstrating a workflow for using a software application, wherein each of the plurality of first embeddings corresponds to a respective content stage of a plurality of content stages of the first set of content, wherein each content stage is a portion of the first set of content representing a respective part of the workflow for using the software application; and detecting a content update trigger based on the plurality of first embeddings, wherein detecting the content update trigger further comprises comparing the first set of content to a second set of content with respect to the plurality of first embeddings, wherein detecting the content update trigger further comprises:

simulating at least one content stage of the plurality of content stages; and capturing the second set of content based on the simulation;

creating a plurality of second embeddings based on the captured set of second content; and comparing the plurality of first embeddings to the plurality of second embeddings.

2. The method of claim 1, wherein creating the plurality of embeddings further comprises:

identifying coordinates of a plurality of content elements among the first set of content; and creating the plurality of embeddings based on the identified coordinates.

3. The method of claim 2, further comprising:

identifying the plurality of content stages based on the plurality of content elements among the first set of content; and classifying the content stages based on at least one interaction with the plurality of content elements among the first set of content.

4. The method of claim 1, further comprising:

tagging each of the plurality of content stages with the corresponding embedding.

5. The method of claim 1, wherein the simulated at least one content stage demonstrates at least one interaction event.

6. The method of claim 1, wherein simulating the at least one content stage further comprises:

replaying at least one action demonstrated in the first set of content.

7. The method of claim 1, wherein simulating the at least one content stage further comprises:

determining at least one aspect of a first environment in which the at least one first set of content was captured; and simulating at least a portion of the workflow for using the software application using a second environment having the determined at least one aspect.

8. The method of claim 1, wherein simulating the at least one content stage further comprises:

submitting a plurality of commands based on the at least one content stage, wherein the plurality of commands is executed with respect to the software application via a command-line interface.

9. A non-transitory computer readable medium having stored thereon instructions for causing a processing circuitry to execute a process, the process comprising:

creating a plurality of first embeddings based on a first set of content demonstrating a workflow for using a software application, wherein each of the plurality of first embeddings corresponds to a respective content stage of a plurality of content stages of the first set of content, wherein each content stage is a portion of the first set of content representing a respective part of the workflow for using the software application; and detecting a content update trigger based on the plurality of first embeddings, wherein detecting the content update trigger further comprises comparing the first set of content to a second set of content with respect to the plurality of first embeddings, wherein detecting the content update trigger further comprises:

simulating at least one content stage of the plurality of content stages; and capturing the second set of content based on the simulation;

creating a plurality of second embeddings based on the captured set of second content; and comparing the plurality of first embeddings to the plurality of second embeddings.

10. A system for detecting content updates, comprising:

a processing circuitry; and a memory, the memory containing instructions that, when executed by the processing circuitry, configure the system to:

create a plurality of first embeddings based on a first set of content demonstrating a workflow for using a software application, wherein each of the plurality of first embeddings corresponds to a respective content stage of a plurality of content stages of the first set of content, wherein each content stage is a portion of the first set of content representing a respective part of the workflow for using the software application; and detect a content update trigger based on the plurality of first embeddings, wherein detecting the content update trigger further comprises comparing the first set of content to a second set of content with respect to the plurality of first embeddings, wherein the system is further configured to:

simulate at least one content stage of the plurality of content stages; and capture the second set of content based on the simulation;

create a plurality of second embeddings based on the captured set of second content; and compare the plurality of first embeddings to the plurality of second embeddings.

11. The system of claim 10, wherein the system is further configured to:

identify coordinates of a plurality of content elements among the first set of content; and create the plurality of embeddings based on the identified coordinates.

12. The system of claim 11, wherein the system is further configured to:

identify the plurality of content stages based on the plurality of content elements among the first set of content; and classify the content stages based on at least one interaction with the plurality of content elements among the first set of content.

13. The system of claim 10, wherein the system is further configured to:

tag each of the plurality of content stages with the corresponding embedding.

14. The system of claim 10, wherein the simulated at least one content stage demonstrates at least one interaction event.

15. The system of claim 10, wherein the system is further configured to:

replay at least one action demonstrated in the first set of content.

16. The system of claim 10, wherein the system is further configured to:

determine at least one aspect of a first environment in which the at least one first set of content was captured; and simulate at least a portion of the workflow for using the software application using a second environment having the determined at least one aspect.

17. The system of claim 10, wherein the system is further configured to:

submit a plurality of commands based on the at least one content stage, wherein the plurality of commands is executed with respect to the software application via a command-line interface.

* * * * *